United States Patent
Simon

(10) Patent No.: US 11,195,287 B2
(45) Date of Patent: Dec. 7, 2021

(54) METHOD AND DEVICE FOR CHECKING THE PLAUSIBILITY OF A FLOW VECTOR HYPOTHESIS

(71) Applicant: Robert Bosch GmbH, Stuttgart (DE)

(72) Inventor: Stephan Simon, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/640,240

(22) PCT Filed: Jul. 25, 2018

(86) PCT No.: PCT/EP2018/070138
§ 371 (c)(1),
(2) Date: Feb. 19, 2020

(87) PCT Pub. No.: WO2019/038008
PCT Pub. Date: Feb. 28, 2019

(65) Prior Publication Data
US 2020/0250838 A1 Aug. 6, 2020

(30) Foreign Application Priority Data
Aug. 22, 2017 (DE) .......................... 102017214614.1

(51) Int. Cl.
*G06T 7/246* (2017.01)
*G06K 9/62* (2006.01)

(52) U.S. Cl.
CPC ............ *G06T 7/248* (2017.01); *G06K 9/6215* (2013.01); *G06K 9/6267* (2013.01); *G06T 2207/10016* (2013.01)

(58) Field of Classification Search
None
See application file for complete search history.

(56) References Cited

FOREIGN PATENT DOCUMENTS

| | | |
|---|---|---|
| JP | 2010113466 A | 5/2010 |
| JP | 2014197353 A | 10/2014 |

OTHER PUBLICATIONS

McCandless, Jeffrey W. "Detection of aircraft in video sequences using a predictive optical flow algorithm." Optical Engineering 38.3 (1999): 523-531. (Year: 1999).*

(Continued)

*Primary Examiner* — Vu Le
*Assistant Examiner* — Tracy Mangialaschi
(74) *Attorney, Agent, or Firm* — Norton Rose Fulbright US LLP; Gerard Messina

(57) ABSTRACT

A method and a device for checking the plausibility of a flow vector hypothesis includes ascertaining a prediction vector associated with a feature based on a movement of the feature between a first image and a second image that follows the first image in a sequence; generating a hypothesis vector that is associated with the feature and describes a presumed movement of the feature between the second image and a third image that follows the second image in the sequence; calculating a degree of similarity between the prediction vector and the hypothesis vector; and evaluating, based on the calculated degree of similarity, a plausibility of the hypothesis vector describing an actual movement of the feature between the second and third images.

12 Claims, 3 Drawing Sheets

(56) References Cited

OTHER PUBLICATIONS

Yilmaz, Alper, Omar Javed, and Mubarak Shah. "Object tracking: A survey." Acm computing surveys (CSUR) 38.4 (2006): 13-es. (Year: 2006).*
Bhanu, Bir, Ramakant Nevatia, and Edward M. Riseman. "Dynamic-scene and motion analysis using passive sensors. II. Displacement-field and feature-based approaches." IEEE Expert 7.1 (1992): 53-64. (Year: 1992).*
Kruger, W., Wirfried Enkelmann, and S. Rossle. "Real-time estimation and tracking of optical flow vectors for obstacle detection." Proceedings of the Intelligent Vehicles' 95. Symposium. IEEE, 1995. (Year: 1995).*
Gibson, David, and Michael Spann. "Robust optical flow estimation based on a sparse motion trajectory set." IEEE Transactions on Image Processing 12.4 (2003): 431-445. (Year: 2003).*
International Search Report dated Sep. 7, 2018 of the corresponding International Application PCT/EP2018/070138 filed Jul. 25, 2018.
Jeffrey W. McCandless "Detection of aircraft in video sequence using a predictive optical flow algorithm," Optical Engineering, Bellingham, vol. 38, No. 3, Mar. 1, 1999, pp. 523-530.
"Dynamic-Scene and Motion Analysis Using Passive Sensors Part II: Displacement-Field and Feature-Based Approaches," IEEE Expert, IEEE Service Center, New York, NY, US, vol. 7, No. 1, Feb. 1, 1992, pp. 53-64.
Yilmaz Alper et al "Object Tracking: A Survey," ACM Computing Surv. ACM, New York, NY, US, vol. 38, No. 4, Dec. 1, 2006, pp. 1-45.

* cited by examiner

METHOD AND DEVICE FOR CHECKING THE PLAUSIBILITY OF A FLOW VECTOR HYPOTHESIS

CROSS-REFERENCE TO RELATED APPLICATIONS

The present application is the national stage of International Pat. App. No. PCT/EP2018/070138 filed Jul. 25, 2018, and claims priority under 35 U.S.C. § 119 to DE 10 2017 214 614.1, filed in the Federal Republic of Germany on Aug. 22, 2017, the content of each of which are incorporated herein by reference in their entireties.

FIELD OF THE INVENTION

The present invention relates to a method and a device for checking the plausibility of a flow vector hypothesis.

BACKGROUND

In the optical flow (OF), instances of correspondence in the temporal direction are formed by determining associations between coordinates in a first image and coordinates in a second image. Such a correspondence then indicates how the projection of a point in the 3-D scene into the 2-D image has moved further from an old coordinate to a new coordinate. In this context, the movement in the image can be produced by the motion of the scene point or by the motion of the camera or by both at the same time. The optical flow is already used in different products, for example, in driver assistance systems.

SUMMARY

A method of the present invention for checking the plausibility of a flow vector hypothesis includes ascertaining a prediction vector associated with a feature based on a movement of the feature between a first image and a second image, the second image being an image following the first image in a sequence of images; generating a hypothesis vector that is associated with the feature and that describes a presumed movement of the feature between the second image and a third image that follows the second image in the sequence of images; calculating a degree of similarity between the prediction vector and the hypothesis vector based on a difference between the prediction vector and the hypothesis vector; and evaluating a plausibility of the hypothesis vector based on the calculated degree of similarity, it being evaluated if the hypothesis vector describes an actual movement of the feature between the second image and the third image.

A device of the present invention for checking the plausibility of a flow vector hypothesis includes a processing unit configured to ascertain a prediction vector associated with a feature based on a movement of the feature between a first image and a second image that follows the first image in a sequence of images; generate a hypothesis vector that is associated with the feature and that describes a presumed movement of the feature between the second image and a third image that follows the second image in the sequence; calculate a degree of similarity between the prediction vector and the hypothesis vector based on a difference between the prediction vector and the hypothesis vector; and evaluate a plausibility of the hypothesis vector based on the calculated degree of similarity, it being evaluated if the hypothesis vector describes an actual movement of the feature between the second image and the third image.

The first, second, and third images are images of a sequence of images. In this context, the sequence of images is, for example, a video sequence. In this case, the first image preferably appears first, then the second image, and then the third image, in chronological succession in the sequence of images.

The feature is a feature reproduced in the image. In this context, the reproduction of the feature is limited to, in particular, a single pixel or a group of pixels. A motion of an object in the surrounding area illustrated by the image and/or a motion of a camera, by which the images were recorded, is represented by the movement of the feature between the images.

During the determination of the prediction vector associated with the feature, a movement of the feature between the first image and the second image is measured. Thus, a change in position of the feature between two images is recorded, and from this, an expected future change in position of the feature is deduced. This movement can be described by a vector that connects a starting point of the movement in the first image to an end point of the movement in the second image. In particular, in sequences of images that have been recorded by a camera, the objects typically move continuously between individual images. This means that a motion of the object does not change abruptly in its direction or its speed. Therefore, using the movement of the feature between the first image and the second image, it can be estimated how the feature will move between the second and the third image. This movement is described by the prediction vector. In the simplest case, the prediction vector is, in this instance, equal to a movement vector that describes the movement of the feature between the first image and the second image. It is preferable for even more data to have an influence on the determination of the prediction vector. Thus, for example, a motion of the camera can be measured, and this motion can be added to the movement vector in a suitable manner, in order to ascertain the prediction vector from that. Consequently, the predictor describes an expected movement of the feature between the second image and the third image.

Suitable addition of the motion of the camera can be understood to mean, for example, that the movement of the feature between the first image and the second image is initially decomposed into a first component that is generated by the continuous motion of the object, and a second component that is produced by the motion of the camera. A prediction can be made separately for the two components.

Thus, it can be assumed, for example, that the object will continue moving in accordance with the previously observed motion, e.g., at an unchanged speed in space or at an unchanged acceleration in space. In some instances, measurements that come, e.g., from other sensors (e.g., vehicle odometry and/or inertial sensors) or are acquired from camera images, can even be available for the motion of the camera; the intrinsic motion being determined from a plurality of vectors. The prediction of the movement of the feature between the second image and the third image can then be generated by combining, e.g., adding, the two components, that is, a first component for the motion prediction of the object and a second component for the motion of the camera. In this context, the second component can be measured that can result in a higher accuracy than a prediction via simple extrapolation.

During the generation of the hypothesis vector associated with the feature, an assumption is made as to how the feature has moved between the second image and the third image. To that end, for example, an analysis of the third image is conducted as to where, in the third image, there are features that are similar to the sought-after feature, for which the hypothesis vector is generated. Thus, it can be analyzed, for example, where pixels having similar color characteristics are located in the second and the third images. In this context, in particular, the requirement that each feature of an image should be assigned a maximum of one flow vector can also be considered. A hypothesis vector is a flow vector that is regarded as a correct flow vector corresponding to the feature. In this context, however, there is the possibility that the analysis underlying the hypothesis vector is incorrect. Thus, one hypothesis vector is spoken of, since only one hypothesis is initially formulated.

In calculating the degree of similarity between the prediction vector and the hypothesis vector, coupling costs, in particular that describe the degree of similarity, can be calculated. In this context, high coupling costs describe a low degree of similarity, and low coupling costs describe a high degree of similarity. Consequently, the degree of similarity provides an indicator that allows an estimate as to whether a movement of the feature between the first and the second image corresponds to the movement of the feature between the second and the third image within the limits of a tolerance, so that the feature moves according to the hypothesis vector. Assuming the motion of an object does not change abruptly in its direction or its speed, it can be assumed that the hypothesis vector corresponds to the prediction vector within the limits of the tolerance. In this manner, this results in a high degree of similarity and, possibly, low coupling costs, if the degree of similarity is calculated for a hypothesis vector that describes an actual movement of the feature between the second and the third image, that is, if the hypothesis vector is based on a correct hypothesis. If an incorrect hypothesis is formulated, for example, since, in the third image, due to a similarity of color, a pixel, or a combination of pixels are erroneously considered to be the feature for which the hypothesis vector is generated, then the result is a lower degree of similarity and, possibly, high coupling costs, since the prediction vector determines where, within the limits of the tolerance, the feature in question is expected to be represented in the third image.

The difference between the prediction vector and the hypothesis vector is determined, in particular, by a difference in their lengths and/or in their orientations. A speed of motion of the feature in the sequence of images is described by the length. A trajectory of the feature in the sequence of images is described by the orientation. Thus, an actual motion of an object associated with the feature, with respect to a camera that records the images, is described particularly simply by a difference that is based on the length and/or the orientation of the vectors. In this context, in particular, a separate analysis of lengths and orientation is advantageous, since their changes over a progression of the sequence of images can be based upon different assumptions.

In the evaluation of the plausibility of the hypothesis vector, the plausibility is rated higher, if, during the calculation of the degree of similarity, a greater similarity between the prediction vector and the hypothesis vector results than when, in comparison, a low similarity between the prediction vector and the hypothesis vector results. The plausibility describes whether the flow vector hypothesis underlying the hypothesis vector is to be regarded as correct.

In this context, it is assumed that the flow vector hypothesis is correct, that is, the hypothesis vector has a high plausibility, when the degree of similarity is high. Accordingly, it is assumed that the flow vector hypothesis is incorrect, that is, the hypothesis vector has a low plausibility, when the degree of similarity is low.

In the simplest case, the plausibility is evaluated exclusively based on the degree of similarity. However, a combination with other validation methods that permit an evaluation of the plausibility through an alternative approach, is also possible. Thus, for example, the plausibility could be graded high by the method of the present invention, but could be reduced simultaneously by a competing evaluation.

If a plurality of competing hypothesis vectors are available for the movement of a feature point, then the hypothesis vector that results in the highest degree of similarity and/or in the lowest coupling costs with regard to the given prediction vector, can be selected, if these fall below or do not exceed a threshold value. Alternatively, it is possible to order the hypothesis vectors in a sequence in light of the respectively ascertained degree of similarity and/or the respectively ascertained coupling costs, in order to determine, consequently, e.g., the N most plausible hypothesis vectors.

The method of the present invention and the device of the present invention allow a robustness to be increased in an evaluation of a flow vector hypothesis. Consequently, this allows a flow field to be generated with a particularly high degree of reliability.

The device of the present invention is configured to implement the method of the present invention.

It is advantageous when the method is executed in a loop, where, in a current loop pass, the hypothesis vector of the feature is assigned an information item that is based on an information item that is assigned to the hypothesis vector of the feature in a preceding loop pass. Thus, apart from a movement, described by the hypothesis vector, of the feature in the sequence of images, further data about the sequence of images can also be transported away. The data of an image linked to a hypothesis vector can be used, in particular, for the evaluation of the plausibility of the hypothesis vector of a succeeding image. A feature can also be assigned data that describe characteristics of an object illustrated by the feature. In this context, it is particularly advantageous when the hypothesis vector that has been graded as plausible in a first loop pass, is received, together with the linked information, in a flow field as a flow vector, and when, in a succeeding, second loop pass, the hypothesis vector is fetched, together with the linked information, out of the flow field as a prediction vector of the feature for the second loop pass.

In addition, it is advantageous when the information assigned to the hypothesis vector is a result of a coupling test that is executed in each loop pass and in which the prediction vector and the hypothesis vector of the feature are regarded as interlinked if the degree of similarity between the prediction vector and the hypothesis vector exceeds a predefined degree; and, in each loop pass, the evaluation of the plausibility of the hypothesis vector is carried out based on whether, in one or more preceding loop passes, the prediction vector and the hypothesis vector of the feature were regarded as interlinked. Since the evaluation of the plausibility of the hypothesis vector is further carried out based on whether, in one or more preceding loop passes, the prediction vector and the hypothesis vector of the feature were regarded as interlinked, an analysis of a previous history of the hypothesis vector is carried out. This previous history of the hypothesis vector is also referred to as the age of the hypothesis vector. Thus, a hypothesis vector has an old age if the prediction vector and the hypothesis vector of the feature have already been regarded as interlinked a plurality of times in successive loop passes. In particular, a number of successive loop passes, in which the prediction vector and the hypothesis vector of the feature were regarded as interlinked, can be assigned as an age attribute to the hypothesis vector in the form of information. The analysis of the previous history of a hypothesis vector can allow the plausibility to be determined with a high degree of reliability. Consequently, an evaluation of movements of a feature that results from a plurality of preceding images of the sequence of images has an additional influence on the evaluation of the plausibility. Thus, the hypothesis vector is only then regarded as particularly plausible if the associated feature, for which the hypothesis was formulated, continually has low coupling costs in successive loop passes. In this manner, a historic evaluation of the hypothesis is carried out that is particularly reliable.

It is also advantageous when the information item assigned to the hypothesis vector describes an object class of an object associated with the feature. Thus, in particular, an information item that indicates that the feature associated with the hypothesis vector represents an object of a particular object class is linked to the feature. In this context, for example, a probability value that describes a probability that the feature represents an object of a particular object class, is linked to the feature. In this case, the probability value is preferably assigned to the feature in a flow field. In this context, the object class describes, in particular, what is modeled by the feature for the object. In this case, in particular, objects that have similar movement features within the scope of predefined specifications are combined in an object class. In particular, the object class is taken into consideration for evaluating the plausibility of the hypothesis vector, in order to define, for example, a degree of similarity between the prediction vector and the hypothesis vector that must at least be present, in order that the plausibility of the hypothesis vector is evaluated positively. Thus, in particular, a threshold value for the degree of similarity is set to a first value if the object class assigned to the feature is a first object class that includes, for example, objects of the type "person." In addition, the threshold value for the degree of similarity is set to a second value if the object class assigned to the feature is a second object class that includes, for example, objects of the type "vehicle." The first value is less than the second value. The plausibility is only rated higher, if the threshold value is not exceeded. In this manner, in the example object classes "person" and "vehicle," it is taken into account, for example, that for vehicles, a higher continuity in their movement in the sequence of images is to be expected than in the case of persons.

It is also advantageous if, in the calculation of a degree of similarity between the prediction vector and the hypothesis vector, a deviation in the orthogonal direction with respect to the prediction vector is rated more strictly than a deviation in the longitudinal direction with respect to the prediction vector, or a deviation in the orthogonal direction with respect to the hypothesis vector is rated more strictly than a deviation in the longitudinal direction with respect to the hypothesis vector. A stricter rating means that an influence on the calculated degree of similarity is greater. In this manner, it is taken into account that, after its projection into an image, a 3-D point of an object moving in a straight line in equal steps generally does not move in steps of equal size. Instead, the steps in the image are greater when the point is closer to the camera, and the steps are smaller when the point is further away from the camera.

In addition, it is advantageous when the prediction vector is ascertained from a flow field that describes a reverse flow, and/or when the hypothesis vector is ascertained from a flow field that describes a forward flow. In such a calculation of the prediction vector and/or of the hypothesis vector, the prediction vector (in the form of a reverse flow) ends at the image position of the second image, at which the hypothesis vector (in the form of a forward flow) begins, which means that, therefore, an association between the prediction vector and the hypothesis vector is already given implicitly and does not have to be ascertained first. Thus, such a calculation of a reverse flow and of a forward flow is carried out within the scope of the generation of a flow field, since this is needed for an evaluation of the flow field. Consequently, the additional plausibility check of one or more flow vector hypotheses can be carried out with little additional computational expenditure, based on available data.

It is also advantageous when, during the calculation of the degree of similarity, an adaptation of the prediction vector is undertaken, through which a camera motion between a recording of the first image and of the second image is compensated for and/or a camera motion between a recording of the second image and of the third image is compensated for. Therefore, a change in a position of the feature in the images that does not result from an intrinsic motion of the associated object can be prevented from influencing the calculation of the degree of similarity and falsifying it.

In addition, it is advantageous for the degree of similarity to be ascertained from the difference between the prediction vector and the hypothesis vector using a predefined function; in particular, a weighting of the difference between the prediction vector and the hypothesis vector is carried out by the predefined function. Thus, the degree of similarity between the prediction vector and the hypothesis vector can be calculated geometrically and converted to a simple numerical value for the degree of similarity. In this context, the weighting of the difference is carried out, in particular, in such a manner, that a small difference results in a particularly large degree of similarity and, possibly, in particularly low coupling costs, and a large difference results in a particularly low degree of similarity and, possibly, in particularly high coupling costs. In particular, the weighting takes place in a nonlinear manner with respect to the degree of similarity.

In addition, it is advantageous when, in the calculation of the degree of similarity, the difference is ascertained using a difference vector that is generated by calculating a difference of the prediction vector and the hypothesis vector. Such a difference vector is a parameter that is simple to calculate and describes the similarity between the prediction vector and the hypothesis vector. Prediction vectors and hypothesis vectors are preferably decomposed, in each instance, into a first component that is generated by the motion of the object, and a second component that is generated by the motion of the camera. Thus, it is advantageous to ascertain the difference vector only using the components generated by the motion of the object.

In addition, it is advantageous when, during the calculation of the degree of similarity, the difference is ascertained using two vector components of the difference vector; in particular, the two vector components are weighted differently. Consequently, a different valuation of the difference is carried out, the valuation being a function of the direction, in which there is a deviation between the prediction vector and the hypothesis vector. Thus, in particular, a deviation that is directed orthogonally to an orientation of the hypothesis vector, or alternatively, orthogonally to an orientation of the prediction vector, is weighted higher and influences the degree of similarity more markedly than a deviation that is directed longitudinally to an orientation of the hypothesis vector, or alternatively, longitudinally to an orientation of the prediction vector. In this manner, for example, deviations in the longitudinal direction are allowed to be evaluated differently, in particular, less strictly, than deviations in the orthogonal direction. This can allow consideration of the fact that after projection into the image, a 3-D point moving in a straight line in steps of equal size generally does not move in steps of equal size in the image. Instead, the steps in the image are greater when the point is closer to the camera, and smaller when the point is further away.

Furthermore, it is advantageous when during the generation of a hypothesis vector associated with the feature, a plurality of hypothesis vectors associated with the feature are generated, and the degree of similarity is calculated and the plausibility is evaluated for each of the hypothesis vectors. Consequently, an advantageous selection of a hypothesis vector to be preferred is provided. In particular, one of the hypothesis vectors is selected based on the plausibility. Thus, the hypothesis vector having the highest plausibility is preferably regarded as a hypothesis vector that describes an actual movement of the feature between the second image and the third image. In this context, however, it is also possible for all the hypothesis vectors to be discarded if, for example, their plausibility lies below a predefined threshold value, since the associated degree of similarity is too low.

In the following, example embodiments of the present invention are described in detail with reference to the accompanying drawings.

DETAILED DESCRIPTION

Figure 1:
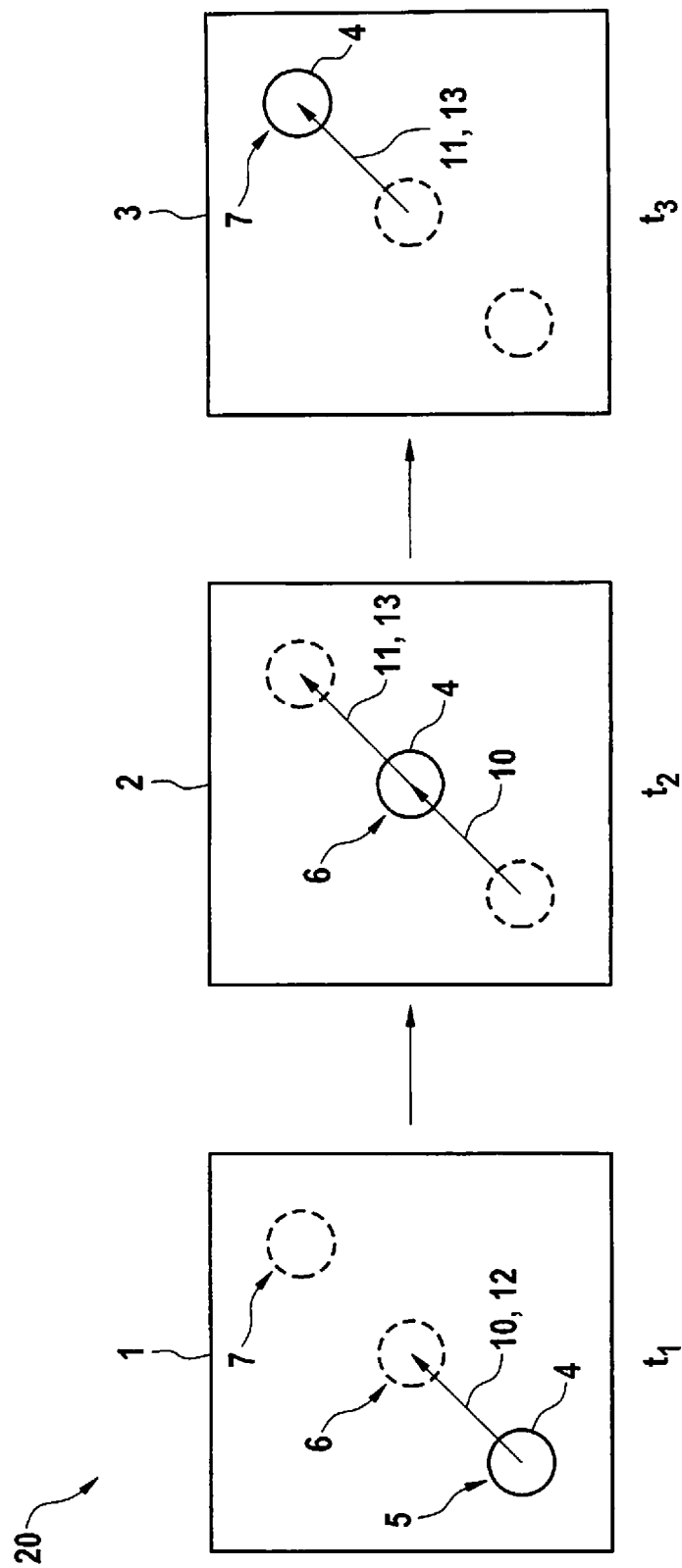
FIG. 1 is a representation of a sequence of images according to an example embodiment of the present invention.

FIG. 1 shows an example of a sequence of images 20. Sequence of images 20 includes a first image 1, a second image 2, and a third image 3. In the example of a sequence of images 20 shown, second image 2 follows first image 1 directly, and third image 3 follows second image 2 directly. However, further images can also be situated between the individual images in the sequence of images 20. Sequence of images 20 is a video sequence recorded by a camera 41. An object that is represented in images 1, 2, 3 as a feature 4 of respective image 1, 2, 3, has been recorded by camera 41. Thus, in the sequence of images 20 shown, feature 4 moves from the lower left to the upper right, through the image shown by the video sequence. In this context, in FIG. 1, the feature is located only at the spot of the respective image 1, 2, 3, at which it is represented by a solid line. A position of feature 4 in the other images is represented by dashed lines. Thus, in first image 1, feature 4 is located at a first position 5. In second image 2, feature 4 is located at a second position 6. In third image 3, feature 4 is located at a third position 7. In this context, feature 4 is limited, in particular, to a low number of pixels.

In addition, two flow vectors 10, 11 associated with feature 4 are represented in FIG. 1. A first flow vector 10 describes a movement of feature 4 between first image 1 and second image 2. A second flow vector 11 describes a movement of feature 4 between second image 2 and third image 3.

Second flow vector 11 is ascertained from second image 2 and third image 3 using an image analysis. This is accomplished by generating or formulating a flow vector hypothesis. A hypothesis vector 13 is generated, using the flow vector hypothesis. Thus, second flow vector 11 corresponds to hypothesis vector 13. In this instance, incorrect results can be produced during the image analysis. In the image analysis, there is the problem that the feature 4 represented in third image 3 could be associated with an object different from that of the feature 4 represented in second image 2. In this case, a hypothesis vector 13 would indeed be calculated, but it is not a correct flow vector, since it does not describe the movement of feature 4 in the sequence of images 20, but connects positions of different features. Consequently, it is not certain whether second flow vector 11 is a correct flow vector. Thus, a flow vector hypothesis is spoken of. Therefore, the flow vector calculated during the generation of the flow vector hypothesis is referred to as a hypothesis vector 13. Since whether or not this is a correct flow vector has not been conclusively settled, a presumed movement of feature 4 between second image 2 and a third image 3 is described by hypothesis vector 13.

A distinction is made between forward flow and reverse flow; the image, in which a reference pixel is located, as well as the image, in which a correspondence has been sought (search direction), being expressed by this. If the result is provided as a flow field (in a matrix pattern), then the coordinate system, in which a flow field is stored, is determined, as a rule, by the search direction. In this context, a flow field is a field made up of flow vectors, in which all, or at least all calculated, flow vectors that are yielded for a pair of two images are inputted. In addition, each of the flow vectors can also be assigned attributes.

In this context, for a forward flow, the reference pixel is searched for in a previous image, and the correspondence is searched for in a current image. The result is stored in the coordinates of the previous image. For a reverse flow, the reference pixel is searched for in the current image, and the correspondence is searched for in the previous image. The result is stored in the coordinates of the current image. In both cases, however, the algebraic signs of the flow vector components of the respective flow vector 10, 11 are set similarly, and namely, so that a horizontal component is positive in the case of a movement to the right in the image, and a vertical component is positive in the case of a downward movement in the image.

The confidence in the flow vector hypothesis and, consequently, a plausibility of hypothesis vector 13, increases, if, in the previous time step, hypothesis vector 13 already had a predecessor that "matches" the flow vector hypothesis in question in direction and magnitude. This is based on the assumption that due to its mass, the object associated with feature 4 moves "inertially," and that camera 41 moves inertially as well, since it is rigidly connected to a mass-laden object (e.g., a vehicle). Thus, abrupt changes in direction practically do not occur in the image plane. In this context, a sufficiently high temporal scanning rate of camera 41 is required.

Thus, a predictor is ascertained that describes a movement of feature 4 between first image 1 and second image 2, using a prediction vector; second image 2 being an image following first image 1 in the sequence of images 20. Therefore, in the example shown in FIG. 1, prediction vector 12 corresponds to first flow vector 12.

First through third images 1, 2, 3 are recorded by camera 41. In this context, first image 1 is recorded at a first time $t_1$, second image 2 is recorded at a second time $t_2$, and third image 3 is recorded at a third time $t_3$. Images 1, 2, 3 are recorded in succession, where $t_1 < t_2 < t_3$, but not necessarily in direct succession (thus, further images can be recorded between them). A constant time interval between images 1, 2, 3 is not necessary. Thus, this means that quotient q $$q = \frac{t_3 - t_2}{t_2 - t_1}$$

generally can be unequal to 1.

For example, an optical flow field already present between times $t_1$ and $t_2$ can be used as a prediction. This is preferably present in the form of a reverse flow, since this has the advantage that prediction vectors 12 are already present in the correct coordinate system, from common time $t_2$; that is, they no longer have to be converted (warped). Consequently, prediction vector 12 is calculated from a flow field that describes a reverse flow.

The flow field used for the prediction can also be generated in a different manner, e.g., using a three-dimensional scene model and assumptions about the camera positions at the times in question, from which the expected flow field can then be calculated.

In the following, by way of example, the simplest case is assumed, namely, that no special effort need be made for supplying the prediction, and that the prediction is from or is generated from the old flow field. The prediction flow field and, therefore, the flow vectors defined in the prediction flow field, are optionally scaled, using a factor, in order to bring the flow vectors and, consequently, prediction vector 12, to the expected lengths. In this context, it is advantageous when the factor for scaling the flow vectors is selected to be equal to quotient q.

This prediction aids in the determination of the next flow field between times $t_2$ and $t_3$. Thus, the two flow fields have time $t_2$ in common. That is, the flow vectors of the first flow field end there, and those of the second begin there. Therefore, it is additionally advantageous when the flow field to be determined between $t_2$ and $t_3$ is initially a forward flow. This series of images can be extended further by adding a further image that is assigned to time $t_4$, where $t_4 > t_3$.

The flow field between $t_2$ and $t_3$ can then be used as a predictor and aid in the next determination of the flow field between times $t_3$ and $t_4$ (time $t_3$ in common), and so on. In this context, the appropriate prediction vectors 12 are fetched out of the flow field between $t_2$ and $t_3$.

One coupling test is carried out per flow vector hypothesis, and therefore, for each hypothesis vector 13. The hypothesis, that is, hypothesis vector 13, is compared to the respective prediction, that is, to prediction vector 12, with regard to orientation and length. Consequently, coupling costs are calculated based on a difference between prediction vector 12 and hypothesis vector 13; the coupling costs indicating a degree of similarity between prediction vector 12 and hypothesis vector 13. In this context, high coupling costs describe a low degree of similarity, and low coupling costs describe a high degree of similarity. Consequently, a degree of similarity between prediction vector 12 and hypothesis vector 13 is calculated based on a difference between prediction vector 12 and hypothesis vector 13.

During the calculation of the coupling costs, an adaptation of prediction vector 12 is optionally undertaken, through which a camera motion between a recording of first image 1 and second image 2 is compensated for and/or a camera motion between a recording of second image 2 and third image 3 is compensated for. To that end, for example, the change in the camera motion is recorded using a sensor system or image analysis, and the change in the movement at the specific pixel generated from it is ascertained and added to first flow vector 10, in order to calculate prediction vector 12.

Prediction vector 12 and hypothesis vector 13 are regarded as "concatenated" or "linked," since they fit together, illustratively speaking. This characteristic increases the confidence in the flow vector hypothesis consequently confirmed and can be appended to the specific flow vector as a measure of quality or a quality attribute. Therefore, a plausibility of the flow vector hypothesis is increased. In the coupling test, prediction vector 12 and hypothesis vector 13 of feature 4 are regarded as interlinked if the degree of similarity between prediction vector 12 and hypothesis vector 13 exceeds a predefined degree, that is, if the coupling costs fall below a predefined measure. If prediction vector 12 and hypothesis vector 13 are regarded as interlinked, then this is assigned to hypothesis vector 13 as an information item.

If hypothesis vector 13 is interlinked in one run of the method, for example, during generation of a prediction vector 12 associated with feature 4, based on a movement of feature 4 between second image 2 and third image 3, then this information item can be taken into consideration for evaluating the plausibility in a later run of the method. Consequently, in this case, the evaluation of the plausibility of hypothesis vector 13 is carried out based on whether, in one or more preceding loop passes, prediction vector 12 and hypothesis vector 13 of feature 4 were regarded as interlinked.

If this coupling test is successful several times in temporal succession, then the confirmation extends correspondingly far into the past. In this context, the age of the flow vector or hypothesis vector 13 is spoken of; the number of uninterrupted, successful coupling tests being meant by this. On its part, the age formed in this manner constitutes a quality attribute again that is represented as a number and can be appended to the respective flow vector.

The method is executed in a loop that means that aging of flow vectors that are associated with a feature 4 becomes possible. In this context, hypothesis vector 13 and prediction vector 12 for feature 4 are regarded as interlinked in a current loop pass if the calculation of the coupling costs indicates a degree of similarity between prediction vector 12 and hypothesis vector 13 that is greater than a predefined degree, and/or if there is no alternative hypothesis vector for which an even higher degree of similarity is present. The plausibility of a flow vector hypothesis of a loop pass following the current loop pass is additionally increased, if hypothesis vector 13 and prediction vector 12 for feature 4 are already regarded as interlinked in the current loop pass.

Therefore, one could also speak of concatenation (even if this is not explicitly stored as such). The age formed in this manner can be used as a quality criterion, in order to isolate effective flow vectors and/or to eliminate outliers. Most of the outliers can already be eliminated by a threshold "age≥1." Using a higher threshold, the separation becomes even more effective; however, the waiting time (in the sense of the number of images) until a new hypothesis vector 13 (not having a predecessor) is able to reach the threshold for the first time, also increases with the level of the threshold.

In addition, a sensible option of transporting additional data further from image to image using the flow field results if the coupling test at specific feature 4 is successful. For example, second image 2 from time $t_2$ can already be provided with a label information item, e.g., semantic segmentation that indicates, for each feature 4, the probability that the specific pixel belongs to a particular object class (e.g., pedestrian, automobile, bicycle, building, road, curb, sidewalk, guardrail, traffic sign, vegetation, etc.). This information can be passed on using associated hypothesis vector 13 (from $t_2$ to $t_3$). Consequently, this information then arrives at the correct coordinate. Thus, an information item that indicates that the feature 4 associated with the flow vector hypothesis represents an object of a particular object class is linked to feature 4.

This passing-on of an information item and/or of an attribute is then useful, in particular, if the coupling test was successful, since a temporally consistent and physically plausible behavior is then present. Thus, the probability is then high that the passing-on was correct, and that the additional information is subsequently still assigned correctly.

In the following, a preferred option for the coupling test and the calculation of the degree of similarity is described. In this context, the coupling costs are ascertained for a linkage; the coupling costs being made up of an orthogonal component and a longitudinal component. In this context, the difference forming the basis of the coupling costs is ascertained using two vector components 22, 23 of a difference vector 21. In this case, a first vector component 22 describes the orthogonal component, and a second vector component 22 describes the longitudinal component. By definition, vector components 22, 23 are perpendicular to each other.

Figure 2:
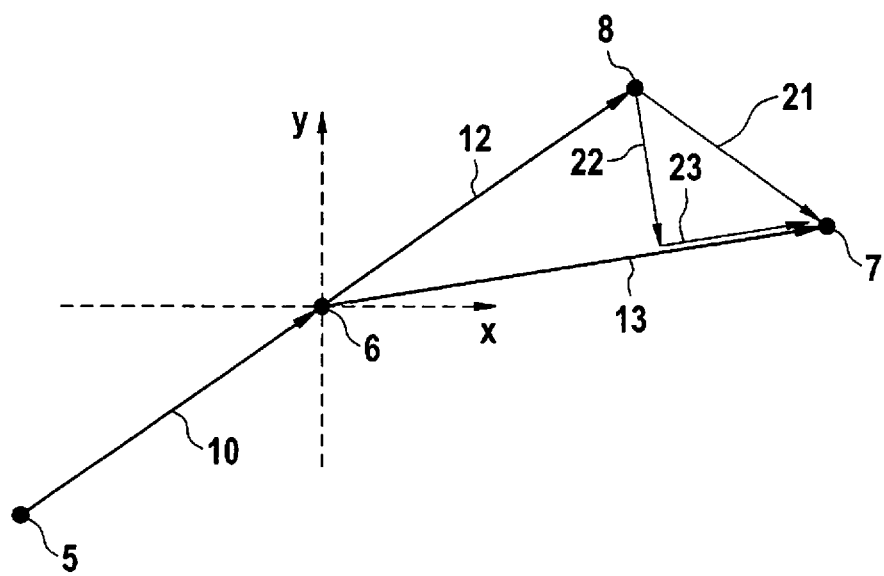
FIG. 2 is a representation of a prediction vector and a hypothesis vector according to an example embodiment of the present invention.

The connection between prediction vector 12 and hypothesis vector 13 is represented illustratively in FIG. 2. Thus, first flow vector 10 is shown in FIG. 2. This describes the movement of feature 4 between first position 5 and second position 6. This movement of feature 4 takes place between first image 1 and second image 2. Prediction vector 12 is ascertained from this movement between first image 1 and second image 2, and therefore, based on first flow vector 10. In this instance, prediction vector 12 is equal to first flow vector 10. This is based on the assumption that, in the case of a constant motion, feature 4 would be located at a theoretical position 8 in third image 3.

In the example shown in FIG. 2, hypothesis vector 13 is also calculated using an image analysis. Consequently, the flow vector hypothesis is formulated that, between second image 2 and third image 3, feature 4 moved to third position 7. This is described by hypothesis vector 13. If a flow field is already present, then the hypothesis vector is ascertained from the flow field. In this context, the flow field preferably describes a forward flow. In order to evaluate if this flow vector hypothesis and, consequently, hypothesis vector 13, are plausible, the coupling costs are now calculated. To that end, difference vector 21 is calculated from the difference between hypothesis vector 13 and prediction vector 12. In a simple case, the difference is equal to a magnitude of difference vector 21; a value of this magnitude being viewed directly as a value for the coupling costs.

However, in the example embodiment described here, the difference underlying the coupling costs is ascertained using vector components 22, 23 of difference vector 21. The orthogonal component, that is, the first vector component 22 perpendicular to hypothesis vector 13, constitutes a measure of the deviation from an orientation; the orientation of hypothesis vector 13 being used as a reference orientation. Alternatively, the orientation of prediction vector 12 could also be used as a reference. The longitudinal component, that is, second vector component 23, and therefore, the second vector component 23 situated in parallel with hypothesis vector 13, measures the deviation in the direction of the reference vector and/or in the reverse direction. Thus, the extension or shortening of hypothesis vector 13 with regard to prediction vector 12 is clearly measured; different scales generally being applied for these two cases.

If the referenced vector corresponds to the zero vector, then no orientation is determined. A special treatment is useful for this case.

The orthogonal and the longitudinal components of the coupling costs that are both non-negative, are then combined, e.g., in the sense of a standard. In this context, the components can also be weighted, of which, however, no use is made in this example embodiment.

However, in this example embodiment, a stricter standard is applied for the evaluation of the orthogonal component than in the case of the longitudinal component, since the orthogonal deviation is to be explained by only a change of direction of the object or a rotation of the camera, whereas in addition, the longitudinal component also changes already due to the object's approaching the camera or moving away from the camera. Thus, a longitudinal change within a predefined interval can be evaluated generously, e.g., in that no coupling costs are generated by it. In this manner, the two vector components 22, 23 are weighted differently.

Figure 3:
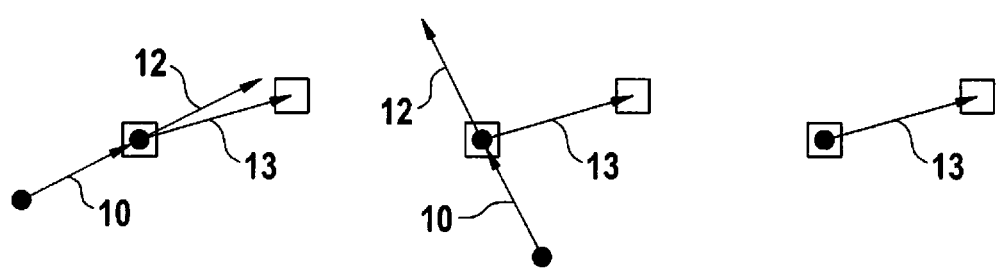
FIG. 3 is a representation of prediction vectors and hypothesis vectors that result in different coupling costs according to an example embodiment of the present invention.

The coupling costs are a measure of the difference between prediction vector 12 and hypothesis vector 13. Examples of combinations of prediction vector 12 and hypothesis vector 13 are shown in FIG. 3. Thus, the coupling costs are equal to zero when prediction vector 12 and hypothesis vector 13 are identical. In FIG. 3, completely to the left, an example is shown in which prediction vector 12 and hypothesis vector 13 are similar to each other and low coupling costs are generated. In the center of FIG. 3, an example is shown in which prediction vector 12 and hypothesis vector 13 are not similar to each other and high coupling costs are generated.

Furthermore, in FIG. 3, on the right, an example is shown in which no prediction vector 12 is present and, consequently, no coupling costs can be calculated.

In order to convert an ascertained difference between prediction vector 12 and hypothesis vector 13 to the coupling costs, the coupling costs are calculated from the difference between the prediction vector and the hypothesis vector using a predefined function. In this context, a weighting of the difference between the prediction vector and the hypothesis vector can be carried out using the predefined function. In this case, the function is, in particular, a function that depends on a magnitude of first vector component 22 and a magnitude of second vector component 23.

The coupling costs can be subsequently modeled in order to convert them to a more usable form, using, for example, a nonlinear function. Such a nonlinear function is shown, by way of example, in FIG. 4. It is piecewise linear and maps non-negative coupling costs onto values that have an algebraic sign and are referred to below as weights. The function can be continuous-valued or discrete-valued. Here, the idea is that "good flow vector hypotheses," that is, ones that have low coupling costs, are raised in value by adding a positive weighting, whereas flow vector hypotheses having high coupling costs are weighted downwards. The coupling costs are represented by a first axis 30, and the weighting is represented by a second axis 31. At a neutral point 32, the weighting transitions from a positive weighting to a negative weighting.

Figure 4:
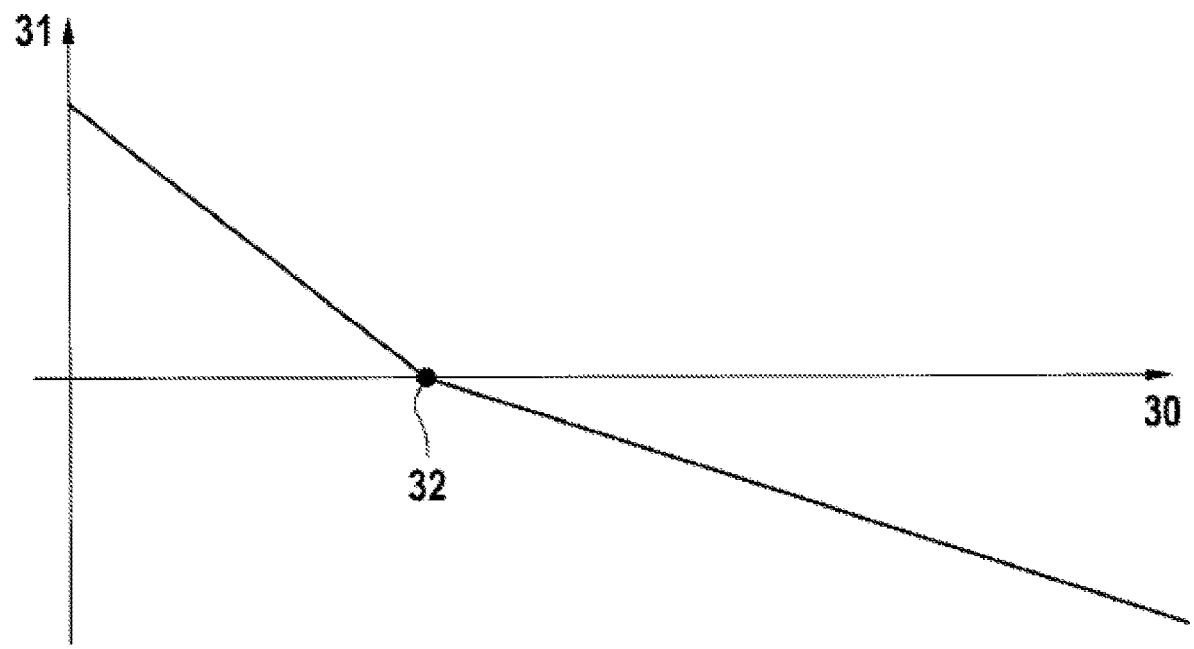
FIG. 4 illustrates an example of a function for weighting coupling costs according to an example embodiment of the present invention.

In FIG. 4, the two axial segments have different slopes and intersect at a point. In this case, the point of intersection lies on the abscissa. This point of intersection is referred to as neutral point 32 and constitutes a significant point. At the neutral point, the additive weighting is exactly zero and, consequently, is as large as in the case of a flow vector hypothesis, for which a prediction does not exist. Thus, using this concept of the additive weightings having an algebraic sign, it is easily possible to take into account the circumstance important in practice that no prediction is available for individual or several or, sometimes, all of the flow vector hypotheses.

The additive weighting can be added to a weighting that is already present, and with which the flow vector hypothesis can already be provided for reasons not described here in further detail. Other solutions for consideration are possible in place of the addition of weightings.

The coupling costs or mappings of them (e.g., according to nonlinear modeling) can be compared to one or more threshold values in order to map the range of values onto a small number of substitute values. This step of linear or nonlinear quantization can have a result that is binary or more than binary.

In the case of the binary decision, this can correspond directly to the discarding or accepting of a flow vector hypothesis. Consequently, a plausibility of the flow vector hypothesis and of associated hypothesis vector 13 is evaluated based on the calculated coupling costs and, therefore, based on the calculated degree of similarity.

If more than 2 substitute values are available, for example, 4, then these can have the following interpretation:

0: the prediction and flow vector hypotheses are inconsistent with each other; and the flow vector hypothesis and, consequently, hypothesis vector 13, are discarded;

1: the prediction and flow vector hypotheses do not agree well with each other, but still agree within the limits of the tolerance; and lack of confidence in the further processing of the flow vector hypothesis and of hypothesis vector 13 is reasonable;

2: the prediction and flow vector hypotheses agree well; and the flow vector hypothesis and, therefore, hypothesis vector 13, can continue to be used normally; and 3: the prediction and flow vector hypothesis agree particularly well or are even identical; and the flow vector hypothesis and, consequently, hypothesis vector 13, can be used for special purposes.

The plausibility of the flow vector hypothesis and, therefore, of associated hypothesis vector 13, is described using the values 0-3 described above. It is apparent that if the coupling costs indicate a first degree of similarity, the plausibility is rated higher than when the coupling costs indicate a second degree of similarity, in which case the first degree of similarity is greater than the second degree of similarity. Thus, the plausibility is rated higher if the prediction and the flow vector hypothesis are not inconsistent with each other. The plausibility is rated lower, if the prediction and the flow vector hypothesis are inconsistent with each other. Whether the prediction and the flow vector hypothesis are inconsistent with each other results from the coupling costs.

During the generation of the hypothesis vector 13 associated with feature 4, a plurality of hypothesis vectors associated with feature 4 are typically generated. In this case, the degree of similarity is calculated, and the plausibility is evaluated for each of hypothesis vectors 13. Thus, coupling costs that describe the degree of similarity of specific hypothesis vector 13 to prediction vector 12 are calculated for each of the hypothesis vectors 13 associated with feature 4. In the evaluation of the plausibility of individual hypothesis vectors 13, each of hypothesis vectors 13 is assigned one of the values 0-3 described above. In this context, of the hypothesis vectors 13 associated with feature 3, the one that is assigned the highest value, is preferably selected for further processing, for example, taken into a flow field.

Therefore, generally speaking, of the hypothesis vectors 13 associated with feature 3, the one that has the highest plausibility in response to the evaluation of the plausibility, is selected for further processing. Thus, starting from a predefined initial value, the plausibility for each hypothesis vector 13 is increased or decreased as a function of the coupling costs and, therefore, as a function of the corresponding degree of similarity. In this context, the plausibility is increased in response to a high degree of similarity and low coupling costs. Accordingly, the plausibility is decreased in response to a low degree of similarity and high coupling costs. In this case, the degree of a change in the plausibility can be a function of the coupling costs, for example. If the plausibility has been evaluated, then, of the hypothesis vectors 13 associated with feature 4, the one that, after the evaluation of the plausibility, has the highest plausibility, is selected for further processing, for example, taken into a flow field.

The result of the comparison of the flow vector hypothesis with the prediction can be a measure of quality that can be coded (in this case, using 2 bits) and stored, passed on or processed further.

A temporal aggregation of such measures of quality is particularly advantageous. To that end, for example, per flow vector, the measure of quality ascertained during the coupling test is "offset" by, for example, added to, an attribute of the flow vector. Such an attribute could be, for example, the age already mentioned. In this case, the measure of quality would be binary, and the addition could be carried out until a maximum age capable of being represented is reached. It is also useful to aggregate signals that are more than binary, over time. However, this attribute would then no longer be able to be interpreted directly as age.

Thus, according to the present invention, a robustness with respect to outliers is increased considerably. Outliers in the optical flow are erroneous correspondence assignments that can occur, e.g., if patterns in the scene repeat.

Using the comparison of the present invention of flow vector hypotheses to the prediction, flow vector hypotheses that behave according to expectation, are preferred, and outlier hypotheses that do not behave in this manner, are effectively suppressed. In addition, a measure of the temporal consistency is gained as additional information item and transported further in time using the flow vectors.

This transport path can also be used for other data.

The idea of flow prediction for evaluating flow vector hypotheses and for transporting attributes can be used both in the case of non-dense optical flow (sparse optical flow), in which the movement is only ascertained for a few significant pixels, and for dense optical flow, in which the movement is ascertained for each pixel or a large portion of the pixels.

An example of such an attribute is the "age" of a flow vector. This can be, e.g., the number of consecutive, successful confirmations in light of the comparison with the specific prediction and, therefore, constitutes a measure of quality or measure of confidence.

Thus, an optical flow prediction is used for confirming or rejecting the plausibility of flow vector hypotheses, e.g., in order to eliminate instances of false correspondence (outliers) or to raise the value of instances of correspondence confirmed by the prediction, or to devalue instances of correspondence not confirmed by the prediction.

In addition, a coupling test between the prediction vector and the hypothesis vector is carried out, thereby generating an evaluation.

In this context, the coupling test is split up into a test of the deviation from an orientation and a test of the deviation along the orientation. This is optionally carried out, using a weighted combination of the components.

Deviations along the orientation, within a predetermined interval, can be permitted. In this case, a different treatment takes place as a function of whether hypothesis vector 13 is longer or shorter than prediction vector 12 (along the orientation).

The prediction is preferably made in the form of a reverse flow, in combination with flow hypotheses in the form of a forward flow. In addition, a measure of the temporal consistency of a flow vector is calculated (in connection with the previous history supplied via the prediction), e.g., as an age attribute. Attributes generated, confirmed, or updated using the coupling test are also provided at an interface, and transport of a desired attribute over time, e.g., in each instance appended to a flow vector, is carried out as a function of a coupling test.

Parameters are preferably used to adapt the prediction, e.g., in order to take into account time intervals or path segments of different size or to compensate for an intrinsic motion of the camera.

Figure 5:
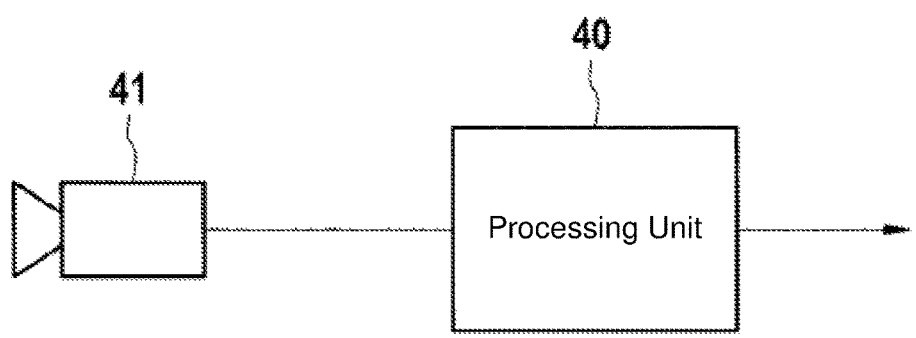
FIG. 5 illustrates a device for checking the plausibility of a flow vector hypothesis according to an example embodiment of the present invention.

A device for checking the plausibility of a flow vector hypothesis, shown in FIG. 5, includes a processing unit 40 that is configured to execute the method described above. In this context, images 1, 2, 3 are provided using a camera 41. However, i images 1, 2, 3 can also be provided by an alternative source, for example, using a storage medium.

Apart from the written description above, reference is explicitly made to the content of FIGS. 1-4.

What is claimed is:

1. A method comprising:
    ascertaining a prediction vector corresponding to a feature, based on a movement of the feature in a sequence of images, between a first image of the sequence and a second image of the sequence that follows the first image in the sequence;
    generating a hypothesis vector that is associated with the feature and describes a presumed movement of the feature between the second image and a third image that follows the second image in the sequence;
    calculating a degree of similarity between the prediction vector and the hypothesis vector, wherein the calculation includes:
        rating a deviation in a direction that is orthogonal to the prediction vector more strictly than a deviation in a same direction as the prediction vector; or
        rating a deviation in a direction that is orthogonal to the hypothesis vector more strictly than a deviation in a same direction as the hypothesis vector; and
    based on the calculated degree of similarity, evaluating a plausibility that the hypothesis vector describes an actual movement of the feature between the second image and the third image,
    wherein, during the calculation of the degree of similarity, the prediction vector is adapted to compensate for a camera motion between a recording of the first image and a recording of the second image and/or a camera motion between a recording of the second image and the third image, wherein a change in movement at a specific pixel generated from the camera motion is ascertained.

2. The method of claim 1, wherein the method is performed iteratively in a plurality of iterations, and, in one of the iterations the hypothesis vector of the feature is assigned an information item based on an information item assigned to the hypothesis vector of the feature in a preceding one of the iterations.

3. The method of claim 2, wherein:
    the information item assigned to the hypothesis vector is a result of a coupling test carried out in each of the iterations;
    in the coupling test, the prediction vector and the hypothesis vector of the feature are regarded as interlinked if the calculated degree of similarity between the prediction vector and the hypothesis vector exceeds a predefined degree; and
    in each of one or more of the iterations, the evaluation of the plausibility of the hypothesis vector is performed based on whether, in one or more of the iterations that preceded the respective iteration, the prediction vector and the hypothesis vector of the feature were regarded as interlinked.

4. The method of claim 2, wherein the information item describes an object class of an object associated with the feature.

5. The method of claim 1, wherein the prediction vector is ascertained from a flow field, which describes a reverse flow, and/or the hypothesis vector is ascertained from a flow field, which describes a forward flow.

6. The method of claim 1, wherein the degree of similarity is ascertained, using a predefined function, based on a difference between the prediction vector and the hypothesis vector.

7. The method of claim 1, wherein the degree of similarity is ascertained, using a predefined function, based on a weighting of a difference between the prediction vector and the hypothesis vector.

8. The method of claim 1, wherein the calculation of the degree of similarity is performed based on a difference vector generated by calculating a difference between the prediction vector and the hypothesis vector.

9. The method of claim 1, wherein the generation of the hypothesis vector includes generating a plurality of hypothesis vectors associated with the feature, and the calculation of the degree of similarity and the evaluation of the plausibility are performed for each of the plurality of hypothesis vectors.

10. A method comprising:
ascertaining a prediction vector corresponding to a feature, based on a movement of the feature in a sequence of images, between a first image of the sequence and a second image of the sequence that follows the first image in the sequence;
generating a hypothesis vector that is associated with the feature and describes a presumed movement of the feature between the second image and a third image that follows the second image in the sequence;
calculating a degree of similarity between the prediction vector and the hypothesis vector, wherein the calculation includes:
rating a deviation in a direction that is orthogonal to the prediction vector more strictly than a deviation in a same direction as the prediction vector; or
rating a deviation in a direction that is orthogonal to the hypothesis vector more strictly than a deviation in a same direction as the hypothesis vector; and
based on the calculated degree of similarity, evaluating a plausibility that the hypothesis vector describes an actual movement of the feature between the second image and the third image,
wherein the calculation of the degree of similarity is performed based on a difference vector generated by calculating a difference between the prediction vector and the hypothesis vector,
wherein the calculation of the degree of similarity includes ascertaining a difference between the prediction vector and the hypothesis vector based on two vector components of the difference vector.

11. The method of claim 10, wherein the calculation of the degree of similarity includes ascertaining a difference between the prediction vector and the hypothesis vector based on two differently weighted vector components of the difference vector.

12. A device comprising a processor, wherein the processor is configured to:
ascertain a prediction vector corresponding to a feature, based on a movement of the feature in a sequence of images, between a first image of the sequence and a second image of the sequence that follows the first image in the sequence;
generate a hypothesis vector that is associated with the feature and describes a presumed movement of the feature between the second image and a third image that follows the second image in the sequence;
calculate a degree of similarity between the prediction vector and the hypothesis vector, wherein the calculation includes:
rating a deviation in a direction that is orthogonal to the prediction vector more strictly than a deviation in a same direction as the prediction vector; or
rating a deviation in a direction that is orthogonal to the hypothesis vector more strictly than a deviation in a same direction as the hypothesis vector; and
based on the calculated degree of similarity, evaluate a plausibility that the hypothesis vector describes an actual movement of the feature between the second image and the third image,
wherein, during the calculation of the degree of similarity, the prediction vector is adapted to compensate for a camera motion between a recording of the first image and a recording of the second image and/or a camera motion between a recording of the second image and the third image, wherein a change in movement at a specific pixel generated from the camera motion is ascertained.

* * * * *